United States Patent [19]
Johnson et al.

[11] 3,995,231
[45] Nov. 30, 1976

[54] MODE-LOCKED CAVITY-DUMPED LASER

[75] Inventors: Richard Howard Johnson, Palm Bay; Eddie Hung Chung Young, Jr., Indialantic; Charles Raymond Burr, Melbourne; Robert Morris Montgomery, Indialantic, all of Fla.

[73] Assignee: Harris-Intertype Corporation, Cleveland, Ohio

[22] Filed: Oct. 28, 1975

[21] Appl. No.: 626,137

Related U.S. Application Data

[63] Continuation of Ser. No. 437,765, Jan. 30, 1974, abandoned.

[52] U.S. Cl............................................. 331/94.5 M
[51] Int. Cl.² ......................................... H01S 3/098
[58] Field of Search.................... 331/94.5; 350/161

[56] References Cited
UNITED STATES PATENTS

3,703,687  11/1972  Maydan.......................... 331/94.5 M
3,804,490  4/1974  Montgomery et al......... 331/94.5 M

*Primary Examiner*—William L. Sikes

[57] ABSTRACT

A mode-locked cavity-dumped laser in which the dumping is phase-coherently synchronized with the mode locking. An acousto-optic modulator is employed in the cavity for dumping. On two passes through the modulator, an envelope pulse of light has two portions deflected to a common output path, one of the portions being shifted upward in frequency and the other downward, by an amount equal to the acoustic excitation frequency. The ability of the modulator to provide output power is therefore envelope-modulated at twice the acoustic frequency. The power of successive output pulses is maintained uniform by synchronizing the phase of the circulating mode-locked pulses with respect to the phase of the envelope modulation.

9 Claims, 4 Drawing Figures

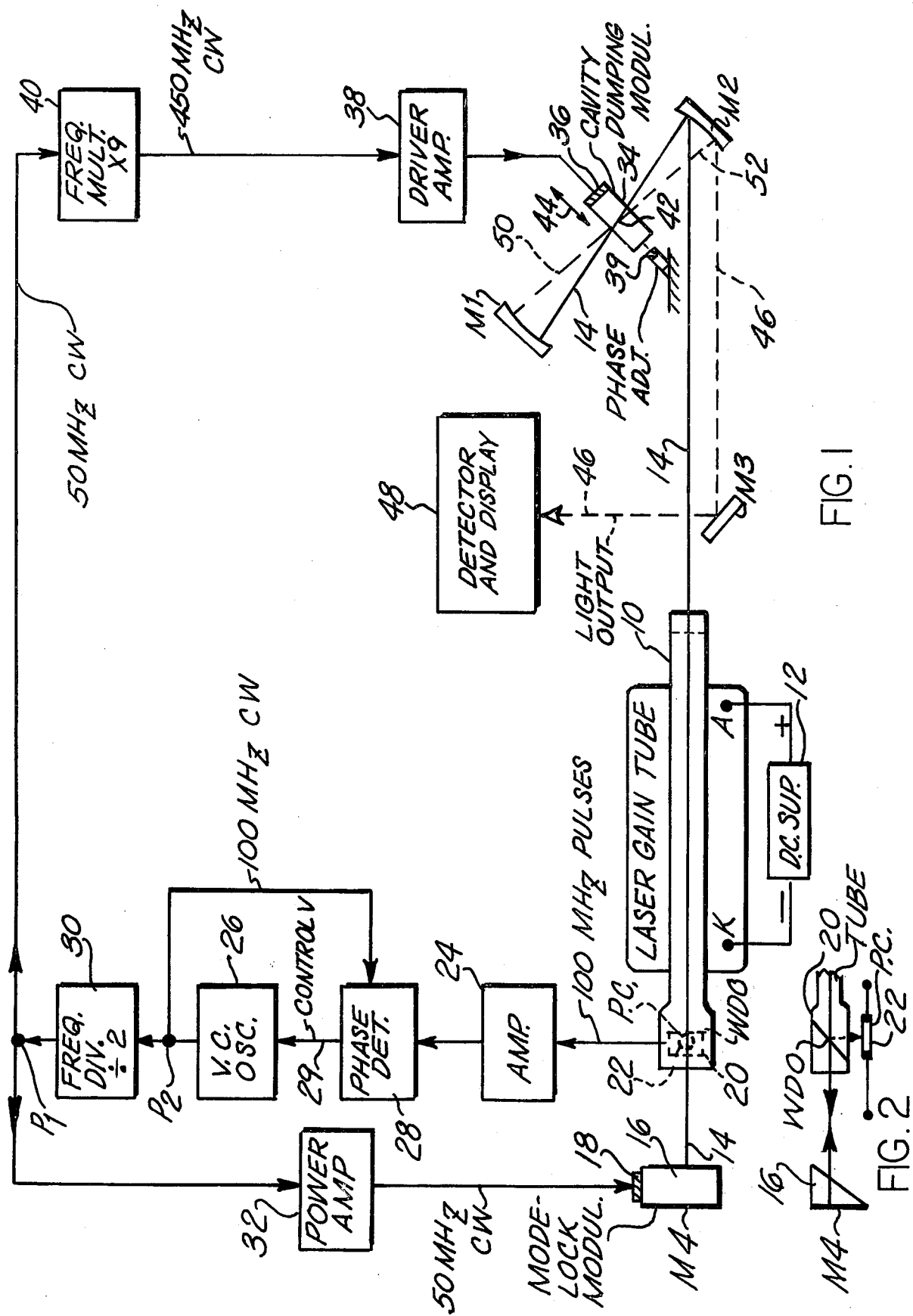

MODE-LOCKED CAVITY-DUMPED LASER

This is a continuation, of application Ser. No. 437,765 filed Jan. 30, 1974 now abandoned.

BACKGROUND OF THE INVENTION

In the prior art a two-pass acoustic modulator has been used in the cavity of a folded-cavity laser for dumping the cavity to produce an output pulse of light. The output pulse from such a two-pass acoustic modulator is known to be intensity-modulated at twice the acoustic frequency of the acoustic modulator. The intensity modulation is the result of alternate destructive and constructive addition of two components of light that constitute the output signal, the frequency of one component being slightly higher than the frequency of light in the laser and the frequency of the other component being slightly lower.

Also known in the prior art are mode-locked lasers in which a short optical pulse that includes many cycles of the light frequency travels in the laser cavity, the pulse circulating back and forth in the cavity repeatedly. Pulses from mode-locked lasers have been used in the past for optical sampling in the observation of fast phenomena.

SUMMARY OF THE INVENTION

The present invention relates to the art of short optical pulse production and more specifically to the art of dumping cavity lasers by means of an intracavity dumping device, whose effectiveness for dumping power from the laser cavity fluctuates cyclically. In a particular embodiment of the invention, a mode-locked laser is employed with a two-pass intracavity dumper, and the laser pulses are phase-coherently synchronized with the fluctuations of the ability of the dumper to dump the cavity effectively; for example, the laser pulses can be phase-synchronized so as to be dumped when the ability of the dumper to extract energy from the cavity is maximum. Thereby, the output pulses are maintained intense and uniform.

More generally, the invention is a method and apparatus for producing light pulses comprising a source of coherent light pulses, and an output device for coupling light out of the source of light pulses, which couples out a plurality of output components of light, not all of the same wavelength, with the plurality of components being combined to form the total output light pulse. The light components, when combined, produce amplitude-modulated output light which is modulated at a beat frequency. The invention also has important synchronizing apparatus by which the light pulses in the source are phase-coherently synchronized with the fluctuating capability of the output device to extract energy, the phase synchronization being such as to extract an output pulse always at a constant level of capability of the output device, for example, at the phase of maximum capability of the output device.

In a further aspect of the invention the cavity dumper of a particular embodiment described herein may be selectively actuated or not actuated in accordance with a digital data stream. When the invention is employed in this manner, and especially when the dumping frequency is almost as great as the pulse repetition frequency of the mode-locked laser, the output of the laser would diminish after a plurality of dumpings occurred in close succession. To prevent such fading of the output pulse intensity, a second output channel can be provided which takes power from the same laser only upon data bits for which the first output does not take power, so that the second output channel, whose output may be discarded, complements the power drawn from the laser by the first output, to maintain constant cyclical extraction of power from the laser and uniform pulse intensity.

BRIEF DESCRIPTION OF FIGURES

FIG. 1 is a block diagram of a preferred embodiment of the invention in which a mode-locked laser is phase-coherently synchronized with an intracavity acousto-optic cavity dumper to produce short intense light output pulses.

FIG. 2 is a side view of a portion of the mode-locked laser whose top view is shown in FIG. 1.

DESCRIPTION OF A PREFERRED EMBODIMENT

Figure 3:
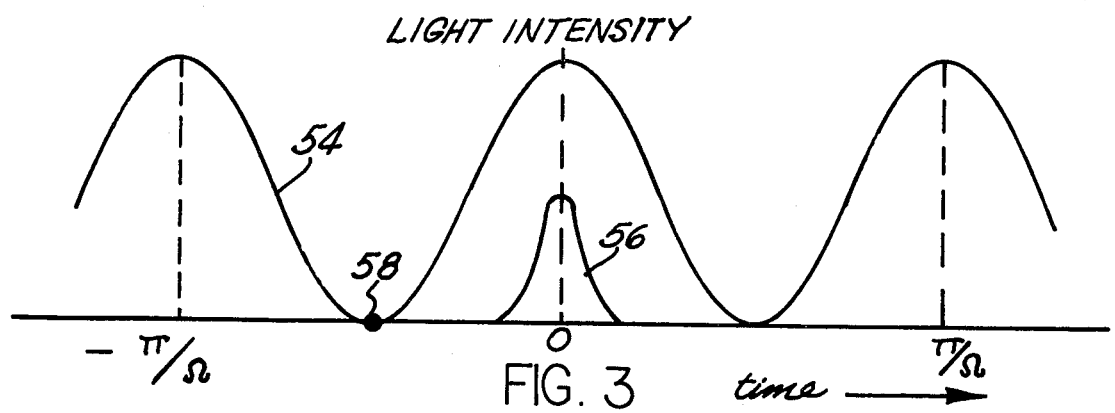
FIG. 3 is a time graph showing the fluctuations in capability of a two-pass cavity dumper to extract energy from the cavity, and also showing the envelope of a light pulse circulating in the cavity, synchronized to occur when the capability of the modulator is maximum.

In a preferred embodiment of the invention, a light pulse circulates in a mode-locked laser at a 100 MHz repetition rate, and an intracavity acousto-optic modulator operates as a cavity dumper to divert light pulses from the cavity. The dumping capability of the cavity dumper varies cyclically at a 900 MHz rate; these fluctuations of effectiveness of the cavity dumper are phase-synchronized with the 100 MHz pulse repetition rate, so that pulses can be dumped when the cavity is at its most capable phase.

The mode-locked laser includes a laser gain tube 10, (FIG. 1) which is a glass envelope about 80 centimeters long having a central constriction of about 60 centimeters length, and filled with argon gas. The laser is pumped continuously by a dc power supply 12 whose positive output terminal is connected to an anode. A near one end of the laser tube and whose negative output terminal is connected to a cathode K near the other end of the laser tube, to produce a longitudinal electric field in the argon. As a result of lasing action, coherent light circulates on a path 14, which follows a folded cavity defined by highly reflective mirrors M1, M2 at the right side of FIG. 1 and M4 at the left side of that figure.

The light circulating in the cavity is pulse modulated, with each pulse envelope being typically of 0.1 nanosecond duration. This pulse duration encloses about 10,000 cycles of light because the light frequency produced by the laser is about $10^{14}$ cycles per second. Each such envelope pulse of light makes a round trip from the laser gain tube 10 along the path 14 to mirror M2, to mirror M1, back to mirror M2, back to the laser tube 10, to the mirror M4, and back again to the laser tube 10, in a total round trip time of approximately 10 nanoseconds. The envelope pulses are produced by mode-locking, in a manner now to be described in more detail.

Mode-locking, whose purpose is to produce relatively short pulses of high power in the laser instead of a continuous wave of low power, is accomplished by a mode-lock modulator 16. In the embodiment being described, the mode-lock modulator 16 is an acousto-optic modulator fabricated from a crystal such as fused quartz. As shown in the side view of FIG. 2, the mode-lock modulator 16 has a triangular cross-section. It is provided with the mirror M4 at its back, and with a piezoelectric crystal 18 at its side, the crystal being a lead zirconate titanate (PZT) material in the embodiment being described.

When the PZT transducer 18 is energized by a 50 MHz continuous wave electrical signal, it produces acoustic waves in the mode-lock modulator M4. The 50 MHz acoustic standing wave that results in the mode-lock modulator 16 has a positive and a negative lobe in each of its cycles, with, of course, zero crossings between the lobes. During most of the duration of a lobe of the acoustic wave, irrespective of whether that lobe is of positive or negative polarity, some of the laser energy entering the mode-lock modulator 16 on path 14 is scattered out of the laser cavity, so that the modulator 16 suppresses laser action in the cavity periodically at a frequency of 100 MHz. For a short time near each zero crossing of the acoustic wave, laser light entering the modulator 16 is scattered very little, so that pulse-shaped envelope modulation of the lasing action is accomplished.

The mode-lock modulator 16 is therefore seen to perform a function like that of a shutter. The opening of the shutter, which occurs at the zero crossings described above, is externally synchronized to occur when the next preceding pulse of light is arriving back at the mode-lock modulator 16 following a round trip through the cavity to mirror M1 and back. The duration of a pulse is only 1% of the period between successive pulses.

Mode-lock synchronization is accomplished by providing a Brewster window 20 in the laser, as best seen in the sectional side view of FIG. 2. A small percentage of light on the principal path 14 is scattered downward by the Brewster window to a photosensitive detector 22, whose electrical output signal is therefore a stream of 100 MHz pulses. The output signal from the photosensitive detector 22 is amplified in a tuned amplifier 24 to serve as a reference signal for a phase-lock oscillator.

The phase-lock oscillator consists of a voltage controlled oscillator 26, a portion of whose output signal at an output circuit P2 is connected to a phase detector 28. The phase detector 28 compares the phase of the output signal of the voltage controlled oscillator 26 with the phase of the output signal of the amplifier 24, and produces therefrom a control voltage on a line 29 which controls the oscillator 26 to keep pace precisely both as to frequency and phase with the pulses of light circulating in the laser cavity. The mode-locking circuit is completed by a frequency dividing circuit 30 whose 50 MHz output signal at a terminal P1 is connected to a power amplifier 32, which drives the piezoelectric crystal 18 of the mode-lock modulator 16.

Cavity dumping of light pulses from the laser cavity is accomplished by an acousto-optic cavity dumping modulator 34, which is located on a folded portion of the cavity path 14 between the mirrors M1 and M2. The concave front surface mirror M1 has a radius of 10 centimeters in the embodiment being described, and the center of the cavity dumping modulator 34 is at the focus of the mirror M1. The mirror M2 has a radius of 20 centimeters. The diffracting medium of the cavity dumping modulator 34 is a fused quartz crystalline material, on one end of which is indiumbonded a lithium niobate transducer 36 for producing acoustic waves in the modulator, traveling in a direction transverse to the light path 14.

The acoustic transducer 36 is electrically energized by a driver amplifier 38 to which is applied a continuous-wave sinusoidal signal of 450 MHz frequency, in FIG. 1. An input signal for the driver amplifier 38 is obtained from a frequency multiplier 40, which takes a sample of the 50 MHz signal at the terminal P1 of the mode-lock loop and multiplies that frequency by 9, using electronic circuits that are well knwon and used in the prior art. The acoustic waves produced in the cavity dumping modulator 34 are consequently seen to be frequency-coherent with the mode-lock loop and hence also therefore coherent with pulses in the cavity, although at a higher frequency than the mode-lock loop.

Adjustment of the relative phase of the acoustic signal with respect to the circulating light pulse is accomplished at a point 42 in the modulator 34, at which the acoustic signal interacts with light pulses on the light path 14. The relative phase is controllable by minute translational movements of the entire cavity dumping modulator 34, in the directions of the arrows 44, because the quartz crystal of the cavity dumping modulator 34 contains a standing acoustic wave, as is well known in the prior art. The position of the cavity dumping modulator 34 is conveniently adjusted by a micrometer mechanical adjustment device 39, to adjust the relative phase of the acoustic wave in the cavity dumping modulator 34 with respect to the circulating light pulse on the cavity path 14. The significance of this phase adjustment will be made clearer hereinbelow; it can be employed to adjust or to maximize the intensity of output light pulses from the apparatus as a whole.

The cavity dumping modulator 34 operates to extract light energy from the circulating light path 14 to provide an output. It does so by redirecting a portion of the circulating light pulses to a flat highly reflective mirror M3, along a light path 46. The output light pulses on the path 46 may be employed for any of a variety of purposes, as exemplified by the detector and display device 48. The light output on the output path 46 consists of two components having slightly different wavelengths, as will now be explained.

The circulating light within the laser cavity, whose path is represented by the solid line 14, is expressed at any particular point on the light path as $E_0(t) \cos w\,t$, where $E_0(t)$ describes the pulse shape of the circulating light, which is assumed to vary slowly with respect to the optical angular frequency $w$. It may be considered that this circulating light makes its first pass through the cavity dumping modulator 34 as it travels from mirror M1 to mirror M2. Part of the light is diffracted by interaction with the acoustic wave produced in the cavity dumping modulator 34 by the acoustic transducer 36. The diffracted component of light is also shifted in frequency by an amount equal to the frequency of the acoustic wave within the modulator 34. This diffracted component of the light, which is represented by a dotted line 50, can be expressed at a point on the path as $\sqrt{n}\, E_0 \cos(w-W)\,t$, where $n$ is the single-pass diffraction efficiency of the acoustic cell 34. The quantity $n$ is therefore the diffracted light intensity divided by the incident light intensity. $W$ is the acoustic excitation frequency in radians per second, and is therefore $2\pi$ times 450 MHz in the described embodiment.

The diffracted component of light travels on the path 50 to the mirror M1 where it is reflected directly back upon itself along the path 50 to pass again through the cavity dumping modulator 34. Thereupon, a portion of it is diffracted a second time so as to fall back onto the circulating beam path 14, and a second portion passes through the cell uneffected along a path 52 to the mirror M2 to form one of the two components of the output beam. The electric field of this first output component is written as $\sqrt{1-n}\ \sqrt{n}\ E_0(t)\cos(w-W)t$ at a particular point on the light path 52, where $t =$ time.

Meanwhile, the portion of the circulating light pulse that was not affected during the first pass through the acoustic cavity dumping modulator 34 has traveled to mirror M1 along the path 14 and has been reflected back along the same path 14 to the modulator 34, where a portion of it is diffracted onto the output beam path 52. This second component of output light can be expressed as $\sqrt{1-n}\ \sqrt{n}\ E_0(t)\cos(w+W)t$. Thus, the time variations of total electric field in the output beam at a particular point on the path 52 are expressed as $E(t) = \sqrt{1-n}\ \sqrt{n}\ E_0(t)\ [\cos(w-W)t + \cos(w+W)t]$. The intensity function of the output beam is $I(t) = (1-n)\ nE_0^2(t)\ [\cos^2(w-W)t + \cos^2(w+W)t + 2\cos(w-W)t\cos(w+W)t]$. Upon averaging over many optical cycles, it is found that the intensity function is $I(t) = 2n(1-n)\ I_0(t)\ (1+\cos 2Wt)$, where $I_0(t) = [E_0^2(t)]/2$.

Hence, the output intensity function is amplitude-modulated at twice the acoustic angular frequency $W$, in the manner of a suppressed carrier wave having an upper and a lower sideband. In the embodiment being described, the frequency of this amplitude modulation is 900 MHz. It is produced by alternately destructive and constructive addition of the two components of output light as their slightly different frequencies beat together. (The electric field of the output light is modulated at only 450 MHz, with alternate lobes being of alternate signs, but the intensity function does not have such sign information and consequently has a modulating frequency of 900 MHz.)

In the embodiment being described, the 0.1 nanosecond duration of the light pulse that is circulating in the laser cavity is smaller than the 1.1 nanosecond period of the 900 MHz amplitude modulation. Consequently, an output light pulse "samples" the 900 MHz modulation envelope at the phase angle of that envelope at which the light pulse occurs. The modulation envelope is seen to represent fluctuations in the dumping capability of the cavity dumping modulator 34. When the pulses are as relatively short as those of the equipment of FIG. 1 the entire pulse is subjected to approximately a single "sampled" value of the more slowly modulating capability of the modulator to dump pulses.

FIG. 3 depicts this modulation function as a curve 54. FIG. 3 also shows a Gaussian-shaped laser light pulse 56, drawn to have a relative phase with respect to the curve 54 corresponding one possible setting of the phase adjustment micrometer 39. When the light pulse envelope 56 occurs with a relative phase as shown in FIG. 3, the output light intensity reaching the display 48 is relatively large, this intensity being the product of the curve 54 and the light pulse envelope curve 56. If instead the light pulse occurred at a valley point of the fluctuating capability of the modulator 34, such as at the time 58, the resulting output light intensity would be almost zero; intermediate phase positions produce intermediate intensities.

In accordance with the present invention, the relative phase of the light pulse 56 with respect to the fluctuating capability 54 of the cavity dumping modulator 34 is phase-synchronized. The relative phase of the light phase 56 can be adjusted by means of the phase adjustment micrometer 39; resulting successive output pulses at the display device 48 or other utilizing device are of uniform intensity, at least so far as the performance of the dumping modulator 34 affects them. It may be noted that when the light pulses 56 are adjusted to occur at a time of maximum effectiveness of the cavity dumping modulator 34, as in FIG. 3, the average peak light intensity of the pulses is equal to the peak light intensity of any one of the pulses, and is twice as great as the average peak light intensity that would be achieved with unsynchronized occurrence of the light pulses, that is with random phase.

Figure 4:
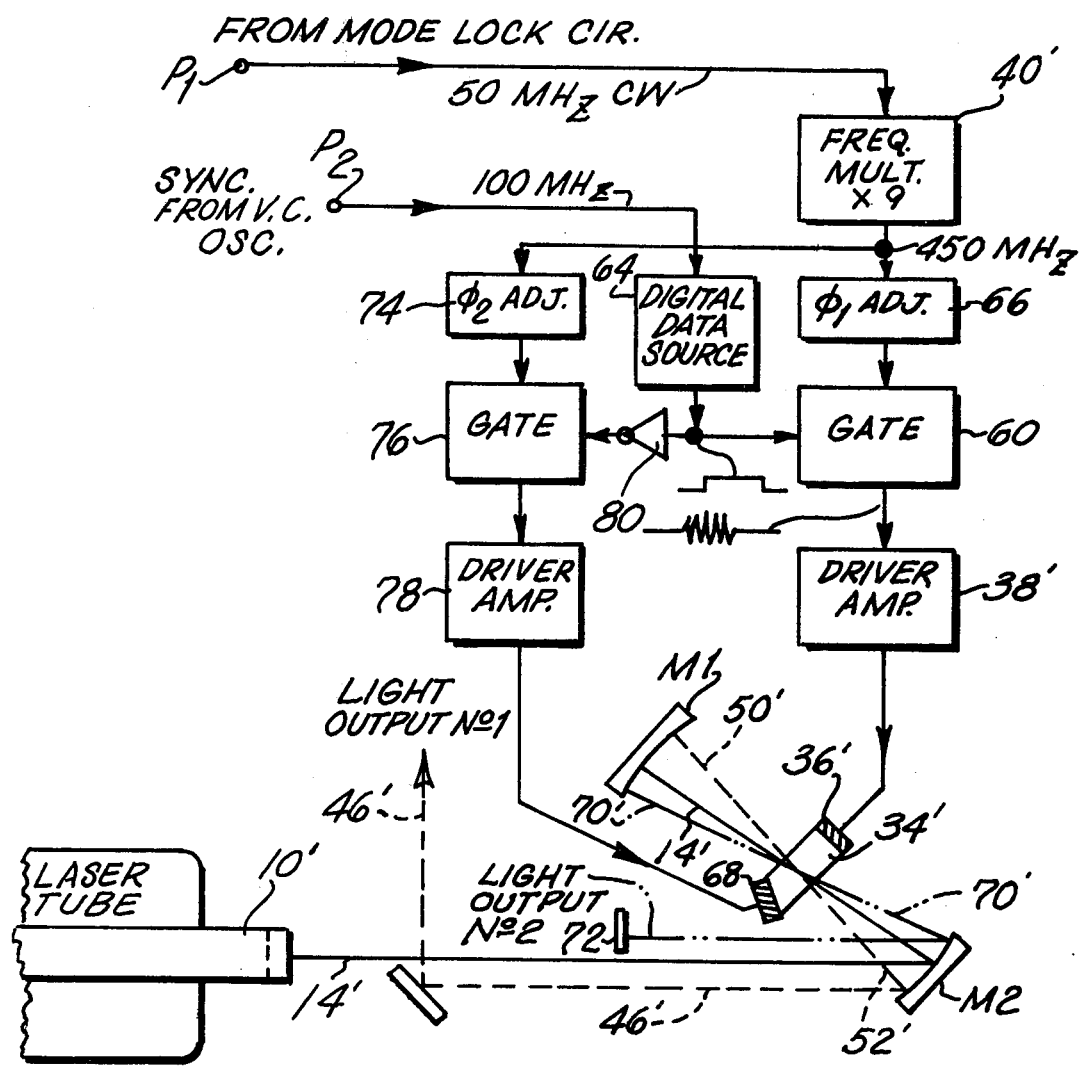
FIG. 4 is a fragmentary block diagram similar to FIG. 1 and having an additional output light path for dumping energy from the laser upon data bits in which the primary output path does not dump energy from the laser.

In FIG. 4 a further aspect of the invention is shown in which the cavity dumping modulator is selectively energized or not energized in dependence upon the data of a digital data stream. This creates a fatigue problem, which is described, along with its solution, hereinbelow. FIG. 4 replaces the right-hand half of FIG. 1. Structural components of FIG. 4 that are similar to components of FIG. 1 are denominated by the same reference numeral employed in FIG. 1 and with a prime symbol suffixed. In this mode of operation of the invention one circulating light pulse may be dumped by the modulator 34, this behavior corresponding to a logic 1 of the data, and the next successive pulse may not be dumped by the modulator 34, this behavior corresponding to a logic 0 of the data.

A gate circuit 60 has been interposed between the frequency multiplier 40' and the driver amplifier 38' to turn the 450 MHz acoustic driving signal on and off in accordance with data from a digital data source 64. The digital data source is synchronized with a 100 MHz signal from the terminal P2 of the voltage controlled oscillator of the mode-lock circuit, FIG. 1. When the digital data source 64 produces a logic 1, the gate 60 is enabled to transmit a train of about 5 cycles of 450 MHz carrier wave to the driver amplifier 38' to energize the transducer 36'. The modulator 34' then deflects a portion of the circulating light from path 14 to the light output path 46' as described in detail hereinabove. When the digital data source 64 produces a logic 0, the gate 60 blocks the 450 MHz carrier wave and the driver amplifier 38' receives no signal with which to energize the acoustic modulator 34', so no light is transferred to the output path 46'.

The phase adjustment micrometer 39 of FIG. 1 has been replaced in FIG. 4 by an electrical phase delay device 66, which can conveniently be an adjustable if air dielectric coaxial transmission line. The relative phase of the mode-locked pulses circulating in the laser cavity and the modulation capability of the modulator 34', which fluctuates cyclically, can therefore be controlled by the phase adjustment device 66. The deflection capability of the modulator 34' is determined by the phase of its excitation carrier signal.

In the circuit of FIG. 4 the occurrence of one or more data 0's followed by two or more data 1's in succession would result in the data 1 output pulse being more intense than subsequent data 1 output pulses. The laser has time to build up to a high power level during the data 0 interval immediately preceding the first data 1 of the train of successive data 1's. The laser does not have a comparable recovery time immediately preceeding a subsequent data 1 bit of the train of successive data 1's. Thus, the objective of obtaining uniform-intensity output pulses would be partially defeated, where the output pulses are being produced in accordance with digital data pulses occurring in rapid succession. Fading of 1's would occur when the data period is smaller than the recovery time of the laser.

To produce uniform intensity of output pulses even when the invention is operated in the data mode of FIG. 4, a second transducer 68 is mounted on the modulator 34' at the opposite end of the crystal diffraction medium from the first transducer 36'. The second transducer 68 is mounted at a different angle than transducer 36' so that it can deflect light out of the main path 14' along an output path 70' which is different from the output path 52' corresponding to the transducer 36'. The transducer 68 is energized only upon data bits for which the transducer 36' is not energized, that is, when a logic 0 bit is produced by the digital data source 64. In this manner, an output pulse is drawn from the laser upon every digital data cycle of the digital data source 64.

Power is therefore drawn in uniform succession from the circulating laser light, and the first digital 1 of a train of 1's is prevented from being any larger than successive digital 1's on the first output path 46'. Output light on the second output path 70' is diffracted to the mirror M2 and reflected therefrom to a mask 72 which absorbs the light. If desired, this secondary output on the light path 70' can instead be employed as a redundant output signal, because its data is the logical inverse of the data on the principal output light path 46'.

Electronic equipment for energizing the second transducer 68 is very similar to that employed for energizing the transducer 36'. A phase adjustment delay line 74 receives a 450 MHz carrier input signal from the frequency multiplier 40', and shifts the phase of the wave before applying it to a gate or modulating circuit 76. The gate circuits 60, 76 can be any of a number of types that are well known and used in the prior electronic art, for example a type popularly referred to as a double-balanced mixer, which employs diodes that are blocked and unblocked by square wave data signals so as to transmit or block the carrier wave to circuits that follow the gate circuits. The envelope-modulated output pulses from the gate 76 are applied to a driver amplifier 78 whose output energizes the secondary transducer 68. Like the first transducer 36', the transducer 68 can be a lithium niobate type that is polished to appropriate thickness. The gate 76 is turned on and off by a logic inverter 80 in accordance with the logic inverse of data from the digital data source 64, which also controls the gate 60. Thus, the two transducers 68, 36' operate to withdraw power from the pulses circulating in the laser tube in a manner that is uniform from one laser pulse to the next, and laser fatigue is uniform.

We claim:

1. Apparatus for producing uniform light pulses comprising:
    source means for providing coherent light pulses at a constant repetition rate along a first light path;
    deflection means for diverting a portion of each of said pulses from said first light path to a second light path, and comprising
    first acousto-optic modulator means located in said first light path and responsive to a modulator drive signal for deflecting a portion of the light of each of said light pulses along said second light path such that the intensity of each deflected light portion is dependent on the magnitude of said modulator drive signal at the time of occurrence of each of said light pulses, and
    first drive means for providing a sinusoidal signal serving as said modulator drive signal; and,
    synchronizing means responsive to said pulse repetition rate for phase coherently synchronizing said drive signal with said pulse repetition rate to thereby obtain uniform intensity of said deflected light portions.

2. Apparatus for producing uniform light pulses as set forth in claim 1 wherein said first synchronizing means comprises frequency tracking means for maintaining the ratio of the frequency of said drive signal to said constant repetition rate in a predetermined ratio of integers, and phase synchronizing means for establishing a fixed phase relationship between said frequencies.

3. Apparatus for producing uniform light pulses as set forth in claim 1, and further comprising optical resonant cavity means having at least two light reflective end pieces disposed along said first light path for folding said light path back upon itself to form a closed path upon which said pulses recurrently circulate.

4. Apparatus for producing uniform light pulses as set forth in claim 3 wherein said source means comprises a laser including a laser medium disposed along said closed path, and optical exciting means for pumping said laser medium to produce said pulses.

5. Apparatus for producing uniform light pulses as set forth in claim 4 wherein one of said end pieces has a spherically shaped reflective surface and wherein said first acousto-optic modulator means is disposed at a fixed distance from said reflective surface, said distance being equal to the radius of curvature of said spherically shaped surface, such that said spherical end piece and said first acousto optic modulator means together comprise a two pass acousto optic modulator means.

6. Apparatus for producing uniform light pulses as set forth in claim 5 wherein said optical excitation means includes mode lock modulating means whereby said cavity means and said source means together comprise mode locked laser means.

7. Apparatus for producing uniform light pulses as set forth in claim 1 and further comprising first gating means interposed between said first acousto optic modulator and said first drive means for selectively blocking said drive signal in accordance with a digital data stream whereby the occurrence of said deflected light portions is controlled thereby.

8. Apparatus for producing uniform light pulses as set forth in claim 7 and further comprising second acousto optic modulator means located in said first light path for deflecting a portion of each of said light pulses along a third light path in response to said modulator drive signal, and second gating means interposed between said second acousto optic modulator and said drive means for selectively blocking said drive signal in accordance with the logic inverse of said digital data stream whereby said light pulses traveling along said first light path are deflected by either but not both of said first or said second acousto optic modulator means.

9. Apparatus for producing uniform light pulses as set forth in claim 8 wherein said first and second acousto optic modulator means are fabricated into a single device having a common acousto optic medium and first and second acousto optic transducer means attached thereto.

* * * * *

UNITED STATES PATENT OFFICE
CERTIFICATE OF CORRECTION

Patent No. 3,995,231  Dated November 30, 1976

Inventor(s) Richard Howard Johnson, Eddie Hung Chung Young, Jr. Charles Raymond Burr and Robert Morris It is certified that error appears in the above-identified patent and that said Letters Patent are hereby corrected as shown below:

Column 8, line 28 change "exciting" to --excitation--,

Column 8, line 28 delete "pumping" and add -- optically exciting--.

Signed and Sealed this

Twenty-second Day of March 1977

[SEAL]

Attest:

RUTH C. MASON
Attesting Officer

C. MARSHALL DANN
Commissioner of Patents and Trademarks